United States Patent
Furuichi

(10) Patent No.: US 8,154,994 B2
(45) Date of Patent: Apr. 10, 2012

(54) HEADER CONVERSION TECHNIQUE

(75) Inventor: Hideyuki Furuichi, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 1502 days.

(21) Appl. No.: 11/207,198

(22) Filed: Aug. 19, 2005

(65) Prior Publication Data

US 2006/0050699 A1     Mar. 9, 2006

Related U.S. Application Data

(63) Continuation of application No. 09/829,972, filed on Apr. 11, 2001, now Pat. No. 7,058,013.

(30) Foreign Application Priority Data

Apr. 12, 2000    (JP) .................................. 2000-110352

(51) Int. Cl.
*G06F 11/00* (2006.01)
*H04L 1/00* (2006.01)
*H04L 12/26* (2006.01)

(52) U.S. Cl. ........ 370/227; 370/225; 370/223; 370/224; 370/228

(58) Field of Classification Search .......... 370/216–228, 370/392, 395.3, 395.31, 395.32
See application file for complete search history.

(56) References Cited

U.S. PATENT DOCUMENTS

| | | | | |
|---|---|---|---|---|
| 4,216,465 A | * | 8/1980 | Huelsman et al. | 341/138 |
| 5,130,984 A | * | 7/1992 | Cisneros | 370/399 |
| 5,164,937 A | * | 11/1992 | Tanabe et al. | 370/399 |
| 5,166,926 A | * | 11/1992 | Cisneros et al. | 370/392 |
| 5,414,701 A | | 5/1995 | Shtayer et al. | |
| 5,600,630 A | * | 2/1997 | Takano et al. | 370/218 |
| 5,610,913 A | * | 3/1997 | Tomonaga et al. | 370/219 |
| 5,671,213 A | * | 9/1997 | Kurano | 370/218 |
| 5,715,237 A | * | 2/1998 | Akiyoshi | 370/228 |
| 5,764,624 A | | 6/1998 | Endo et al. | 370/218 |
| 5,838,677 A | * | 11/1998 | Kozaki et al. | 370/389 |
| 5,889,769 A | * | 3/1999 | Mizuno | 370/328 |
| 5,926,456 A | * | 7/1999 | Takano et al. | 370/218 |
| 6,031,838 A | * | 2/2000 | Okabe et al. | 370/395.6 |
| 6,075,767 A | * | 6/2000 | Sakamoto et al. | 370/228 |
| 6,266,325 B1 | * | 7/2001 | Ishioka et al. | 370/248 |
| 6,333,932 B1 | * | 12/2001 | Kobayasi et al. | 370/389 |
| 6,452,939 B1 | * | 9/2002 | Yang et al. | 370/465 |
| 6,466,576 B2 | * | 10/2002 | Sekine et al. | 370/395.1 |

(Continued)

FOREIGN PATENT DOCUMENTS

CA    2 340 710 A1    3/2000

(Continued)

OTHER PUBLICATIONS

Derwent-ACC-No. 1998579535.*

(Continued)

*Primary Examiner* — Chuong T Ho
(74) *Attorney, Agent, or Firm* — Harrity & Harrity, LLP

(57) ABSTRACT

A header conversion device allowing reduced amount of hardware and memory and high-speed line switching is disclosed. In an ATM switching device having redundant incoming line systems, a header conversion table stores a set of header conversion information for one of the redundant incoming line systems. A header converter converts the header of an ATM cell received from each of the redundant incoming line systems by referring the same set of header conversion information.

20 Claims, 10 Drawing Sheets

U.S. PATENT DOCUMENTS

| | | | |
|---|---|---|---|
| 6,744,726 B1 * | 6/2004 | Minami | 370/217 |
| 6,856,594 B1 | 2/2005 | Aihara et al. | |
| 6,907,001 B1 * | 6/2005 | Nakayama et al. | 370/230 |
| 6,985,435 B1 * | 1/2006 | Belgardt et al. | 370/219 |
| 7,058,013 B2 * | 6/2006 | Furuichi | 370/228 |

FOREIGN PATENT DOCUMENTS

| | | |
|---|---|---|
| DE | 198 37 126 | 2/2000 |
| DE | 198 37 216 A1 | 2/2000 |
| JP | 7-74747 | 3/1995 |
| JP | A 7-264194 | 10/1995 |
| JP | A 8-204716 | 8/1996 |
| JP | A 8-242240 | 9/1996 |
| JP | A 9-27815 | 1/1997 |
| JP | A 9-64875 | 3/1997 |
| JP | 10-79747 | 3/1998 |
| JP | A10-145374 | 5/1998 |
| JP | A 10-313317 | 11/1998 |
| JP | 11032052 * | 2/1999 |
| JP | A 11-32052 | 2/1999 |
| JP | A 2000-49860 | 2/2000 |
| JP | A 2001-217844 | 8/2001 |

OTHER PUBLICATIONS

Derwent-ACC-No. 1999-177840.*

Co-Pending U.S. Appl. No. 09/829,972, entitled "Header Conversion Technique in ATM Switch," Hideyuki Furuichi, filed Apr. 11, 2001.

* cited by examiner

HEADER CONVERSION TECHNIQUE

RELATED APPLICATION

This application is a continuation of U.S. patent application Ser. No. 09/829,972 filed Apr. 11, 2001 (now U.S. Pat. No. 7,058,013, issued on Jun. 6, 2006), the disclosure of which is incorporated herein by reference.

BACKGROUND OF THE INVENTION

1. Field of the Invention

The present invention generally relates to an ATM (asynchronous transfer mode) switching device capable of switching one of lines to another of the lines, and in particular to a header conversion technique for the line switching.

2. Description of the Related Art

In general, an ATM switching device having line protection capability is provided with a header converter and a header conversion table, which are used to switch a working line to a reserved line. More specifically, a plurality of line interfaces are connected to a multiplexer, which multiplexes incoming fixed-length packets (cells) received from the respective line interfaces to produce a sequence of cells each having an incoming line number thereof attached therewith. When receiving the sequence of cells from the multiplexer, the header converter reads the incoming line number and VPI/VCI (Virtual Path Identifier/Virtual Channel Identifier) for each cell and uses them as a key to search the header conversion table for output information necessary for a switch fabric to forward the cell to an appropriate output port thereof. The header converter converts the header of the cell using the found output information. Such output information includes an outgoing line number, outgoing routing information VPI/VCI, and control information for controlling the quality of service for each cell flow. The header conversion technique as described above has been disclosed in Japanese Patent Application Unexamined Publication Nos. 7-74747 and 10-79747.

In the case of redundant system architecture, however, two memory areas used for respective ones of working system and reserved system are needed to store the same information in the header conversion table, resulting in the increased amount of hardware and the increased amount of memory for header conversion table.

As shown in FIG. 1, for example, a 1+1 redundant system having #0 (working) and #1 (reserved) incoming lines includes a header conversion table storing necessary information for respective ones of #0 and #1 incoming lines. When the working line normally functions, the header converter accesses a set of information for the #0 incoming line to obtain necessary information for the switch fabric to forward the cell to an appropriate output port thereof. If the working line is switched to the reserved line due to occurrence of a failure on the #0 system, then a set of information to be accessed is changed from the #0 incoming line to the #1 incoming line.

Therefore, if the set of information for the #0 incoming line is not identical to that for the #1 incoming line, then the line switching cannot be successfully performed. It is necessary to always store the same set of information for the #0 and #1 incoming lines in the header conversion table.

It is the same with the case of N:1 redundant system having N working incoming lines and a single reserved incoming line. In this case, it is further necessary to copy the latest information after a failure has occurred on the working incoming line to a memory area for the reserved incoming line. Since the table duplication is needed after the occurrence of a failure, it is not possible to perform the line switching immediately after the failure occurs and therefore the increased speed of line switching cannot be achieved.

SUMMARY OF THE INVENTION

An object of the present invention is to provide a header conversion method and device eliminating the need of information for a reserved system, allowing reduced amount of hardware and memory.

Another object of the present invention is to provide a header conversion method and device allowing high-speed line switching when a failure occurs.

According to the present invention, a device for converting a header of a packet to forward the packet to an appropriate one of output ports of a switch fabric, includes: redundant incoming line systems; a header conversion table storing a set of header conversion information for one of the redundant incoming line systems; and a header converter for converting a header of a packet received from each of the redundant incoming line systems by referring the set of header conversion information.

According to an aspect of the present invention, a device for converting a header of a packet to forward the packet to an appropriate one of output ports of a switch fabric, includes: at least one line interface; a reserved line interface corresponding to each of said at least one line interface; a selector for normally selecting a corresponding line interface to receive a packet stream and, when a failure occurs on a system corresponding to the corresponding line interface, selecting the reserved line interface to receive the packet stream: a header conversion table storing header conversion information for each of said at least one line interface; and a header converter for converting the header of a packet received from the reserved line interface selected by the selector by referring to the header conversion information for the corresponding line interface.

The at least one line interface and the reserved line interface have line numbers uniquely assigned thereto. A line number of each of said at least one line interface and the reserved line interface may be transferred to the header converter. The header converter may include: a line number converter for converting a line number of the reserved line interface to a line number of the corresponding line interface: and a controller for accessing the header conversion information for the corresponding line interface by using the line number of the corresponding line interface. When the reserved line interface is selected by the selector due to occurrence of the failure, the line number converter may convert the line number of the reserved line interface to the line number of the corresponding line interface.

According to another aspect of the present invention, a device for converting a header of a packet to forward the packet to an appropriate one of output ports of a switch fabric, includes: a plurality of line interfaces connected to respective ones of incoming lines; a reserved line interface; a first selector for connecting a selected one of the incoming lines to the reserved line interface when a failure occurs on a system corresponding to a corresponding line interface: a second selector for normally selecting each of the plurality of line interfaces and, when the failure occurs on the system corresponding to the corresponding line interface, selecting the reserved line interface in place of the corresponding line interface; a header conversion table storing header conversion information for each of the plurality of line interfaces; and a header converter for converting the header of a packet received from the reserved line interface selected by the second selector by referring to the header conversion information for the corresponding line interface.

DETAILED DESCRIPTION OF THE PREFERRED EMBODIMENTS

Figure 1:
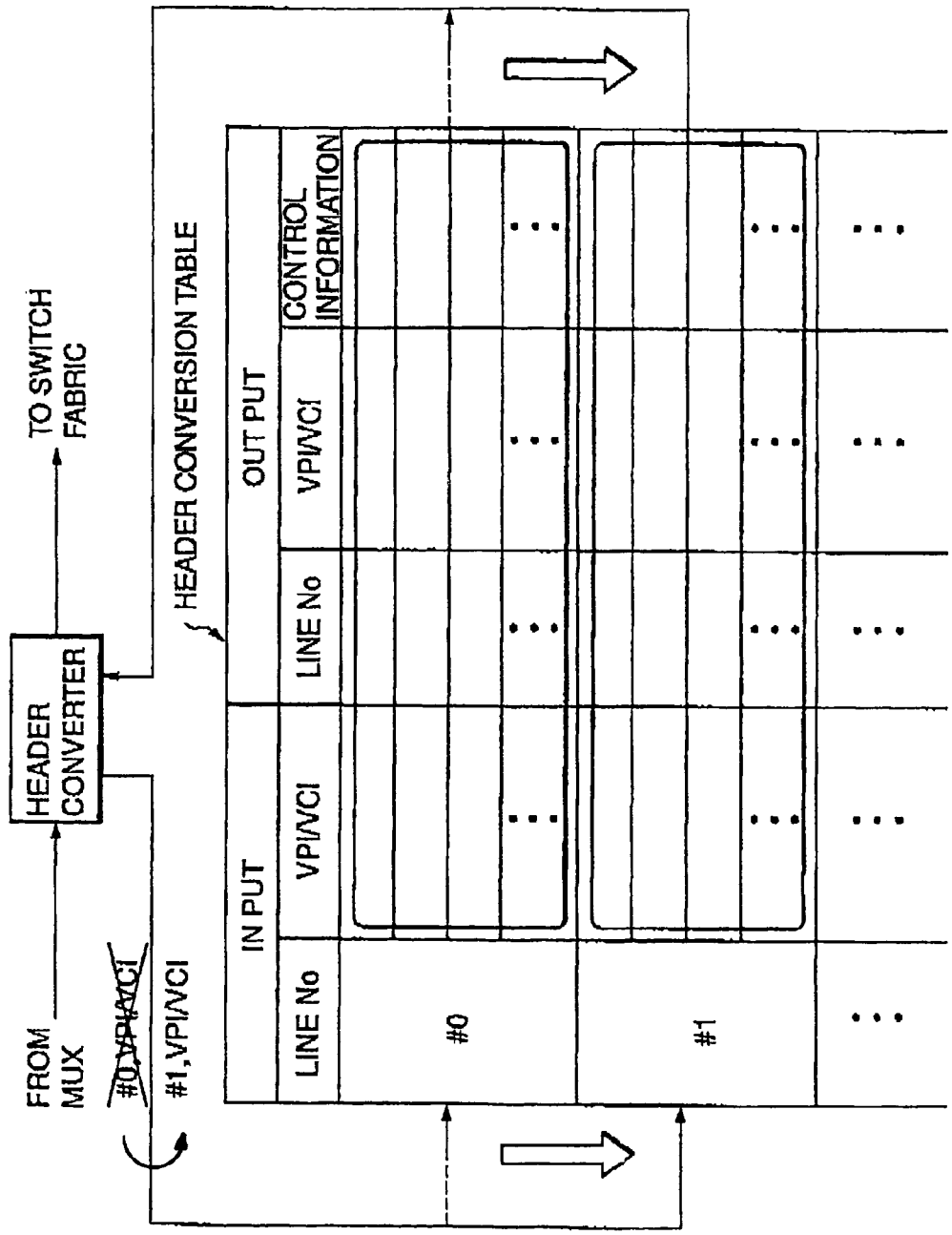
FIG. 1 is a schematic diagram showing a conventional header conversion method.
Figure 2:
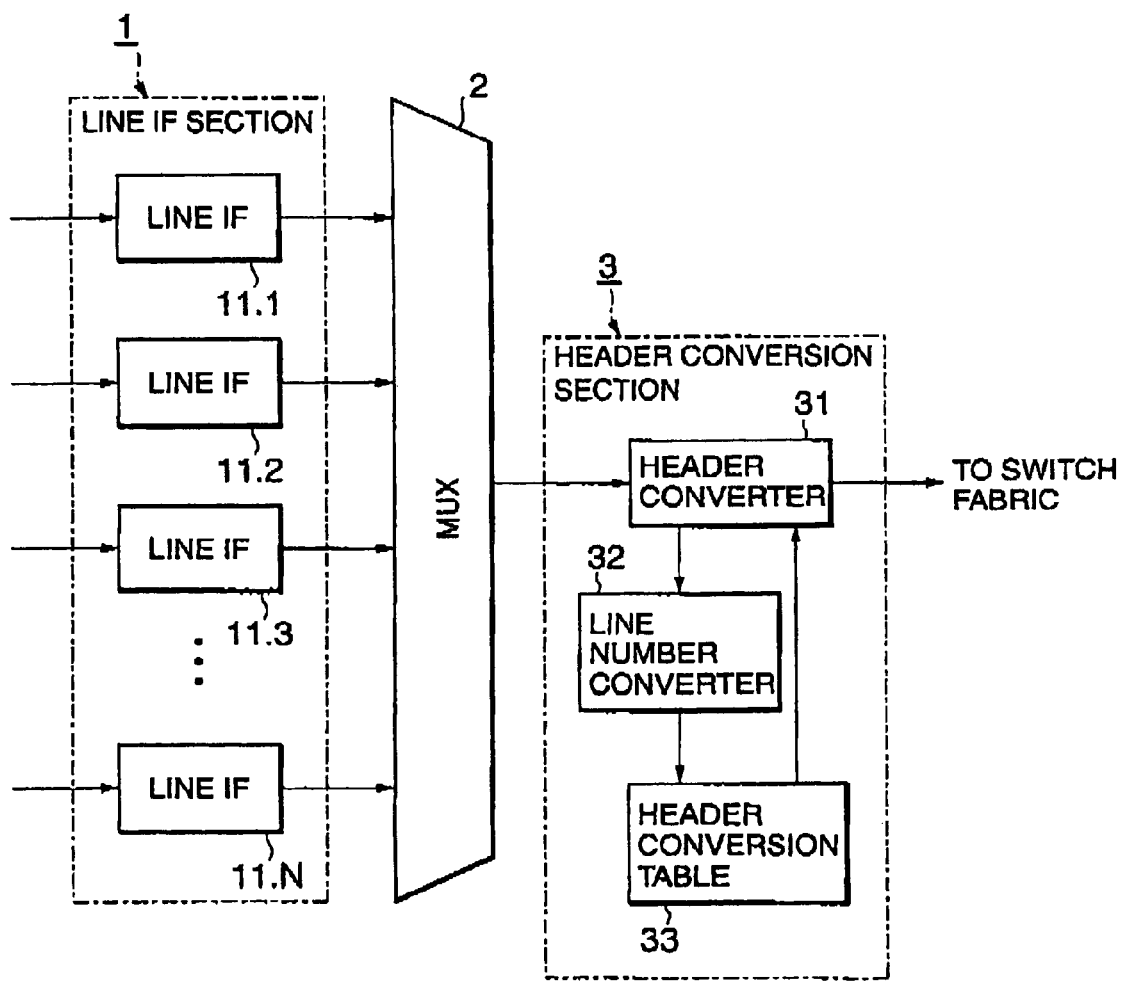
FIG. 2 is a block diagram showing an input stage of an ATM switching device employing a header conversion method according to a first embodiment of the present invention.

Referring to FIG. 2, an ATM switching device employing a header conversion circuit according to a first embodiment of the present invention is provided with a line interface section 1 accommodating N incoming lines.

The line interface section 1 includes N (N is an integer greater than 1) line interfaces 11.1 to 11.N, each of which is connected to a corresponding incoming line to receive data from another ATM switching device or a subscriber communication device. Further, the respective line interfaces 11.1 to 11.N have line numbers (here, #0 to #N−1) uniquely assigned thereto. A cell output of each of the line interfaces 11.1 to 11.N is connected to a multiplexer 2 and a sequence of cells multiplexed by the multiplexer 2 is output to a header conversion section 3. The header conversion section 3 includes a header converter 31, a line number converter 32, and a header conversion table 33.

The header converter 31 outputs the line number and the routing information VPI/VCI for each cell to the line number converter 32 and the header conversion table 33, respectively. The header converter 31 receives necessary information corresponding to the line number and the routing information from the header conversion table 33 and converts the header of each cell using the necessary information. The cell with converted header information is transferred to the switch fabric (not shown), in which the cell is forwarded to an appropriate output port of the switch fabric depending on the converted header information.

Figure 3:
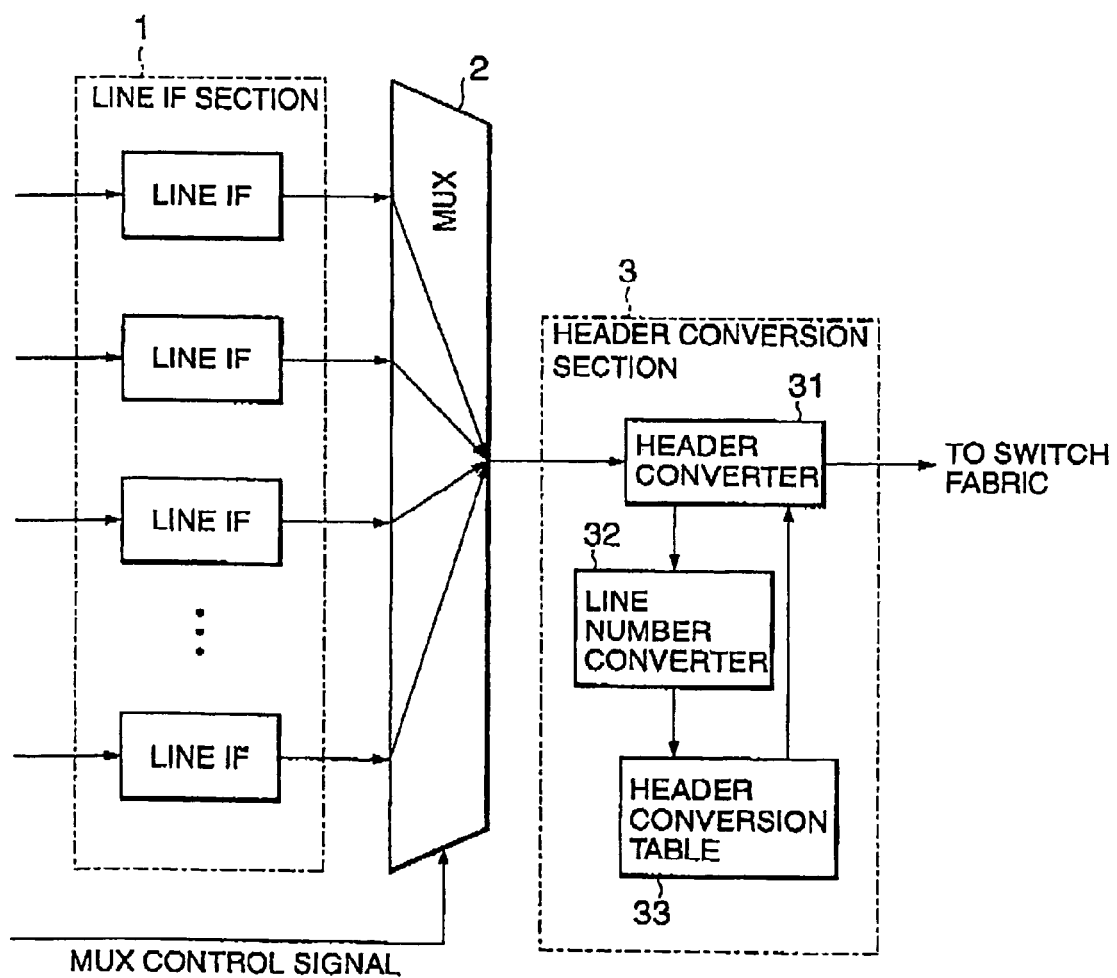
FIG. 3 is a block diagram showing the input stage or the ATM switching device of FIG. 2 for explanation of an operation of the first embodiment.

As shown in FIG. 3, the multiplexer 2 multiplexes incoming fixed-length packets (cells) received from the respective line interfaces 11.1 to 11.N according to a multiplexing control signal to produce a sequence of cells. The sequence of cells is output to the header converter 31 with each cell having the line number of a corresponding line interface at which the cell arrived.

When receiving the sequence of cells from the multiplexer 2, the header converter 31 reads the line number and routing information VPI/VCI for each cell and outputs the line number to the line number converter 32 and the routing information VPI/VCI to the header conversion table 33. A converted line number by the line number converter 32 is output to the header conversion table 33.

In the case of a redundant system, the line number converter 32 allows the line number to be converted to selected line number depending on a control signal. Since the system as shown in FIG. 2 has no redundant architecture, the line number converter 32 does not substantially-convert the line number.

Figure 4:
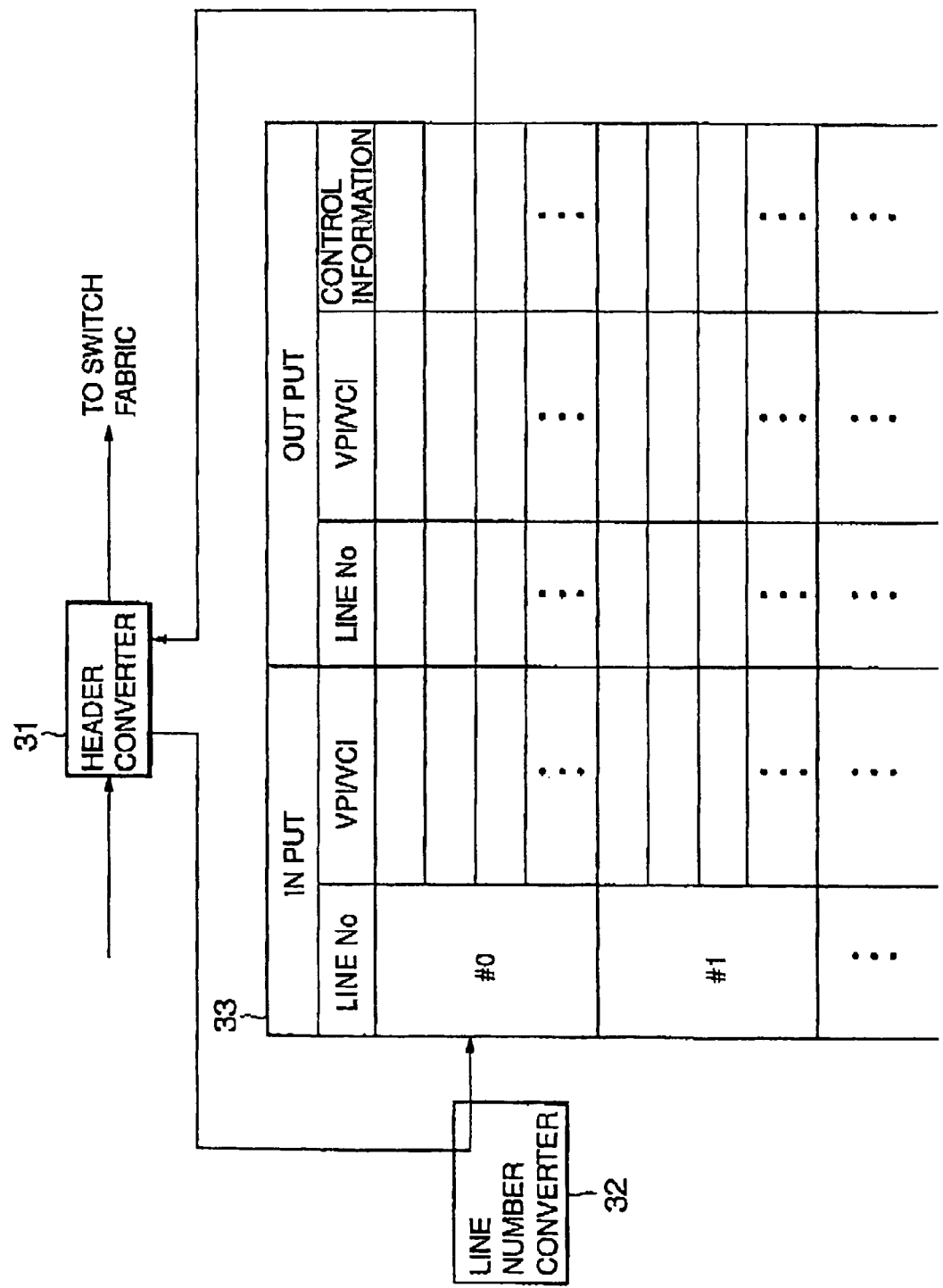
FIG. 4 is a schematic diagram showing a header conversion method according to the first embodiment.

Referring to FIG. 4, the line number and the routing information VPI/VCI for each cell are used as a key to search the header conversion table 33. For example, when receiving a cell arriving at the line interface 11.1 having line number #0 assigned thereto, since the line number is not converted by the line number converter 32, the line number #0 and the routing information VPI/VCI of the cell are used as a key to search the header conversion table 33. When a match is found, the corresponding output information composed of an outgoing line number, outgoing routing information VPI/VCI, and control information is returned to the header converter 31. Using the output information returned from the header conversion table 33, the header converter 31 converts the header of the cell and outputs the cell with converted header to the switch fabric.

In general, the header conversion table 33 includes a decoder or CAM (Contents Addressable Memory) and a random access memory (RAM) storing output information. After the line number and the routing information VPI/VCI are converted to a memory address by the decoder or CAM, the output information stored in the RAM is accessed according to the memory address and is returned to the header converter 31.

1+1 Redundant System

Figure 5:
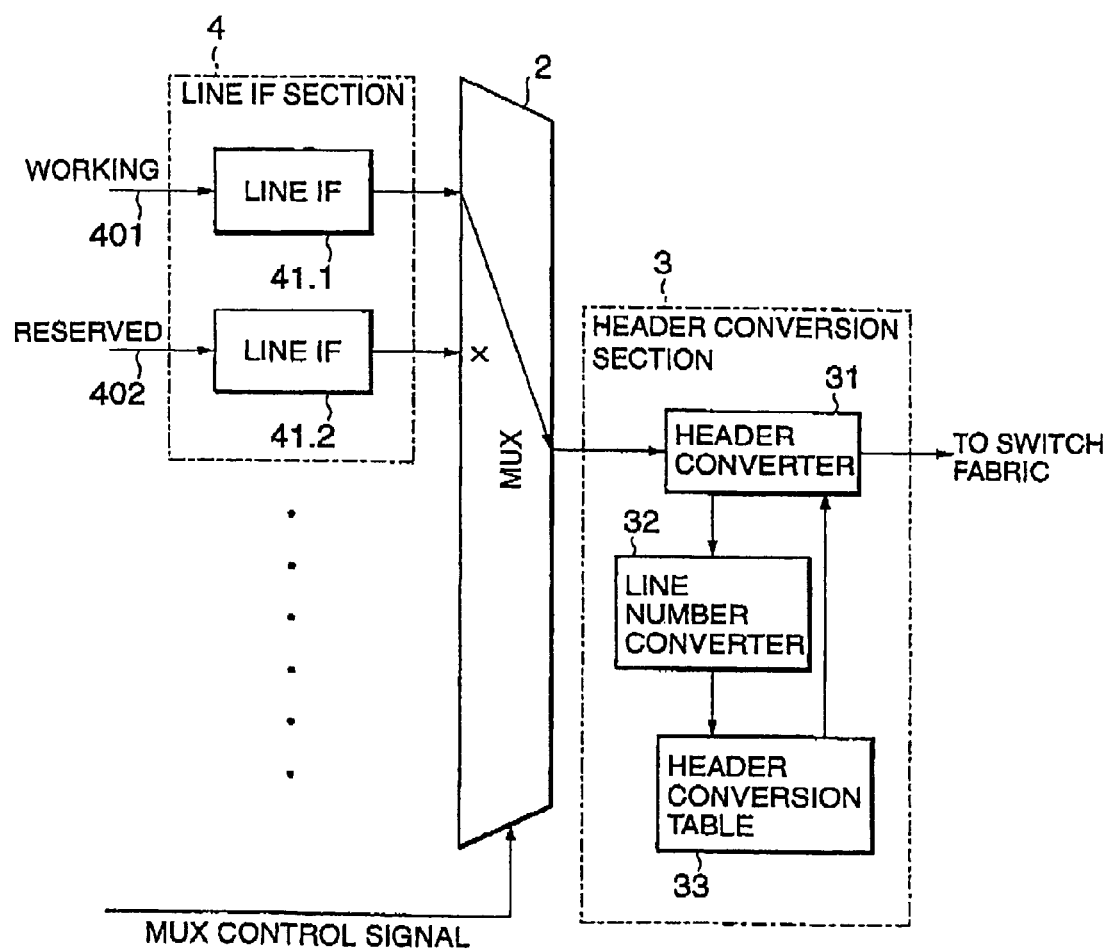
FIG. 5 is a block diagram showing an input stage of an ATM switching device employing a header conversion method according to a second embodiment of the present invention.

Referring to FIG. 5, an ATM switching device employing a header conversion circuit according to a second embodiment of the present invention has a 1+1 redundant architecture, in which circuit blocks similar to those previously described with reference to FIG. 2 are denoted by the same reference numerals.

A line interface section 4 accommodates a working line 401 and a reserved line 402, which are connected to a line interface 41.1 and a line interface 41.2, respectively. Here, line numbers #0 and #1 are assigned to the line interface 41.1 and the line interface 41.2, respectively. Plural line interface sections having the same circuit as the line interface section 4 may be connected to the multiplexer 2.

When normally operating, the same data is transferred on both the working line 401 and the reserved line 402. However, the multiplexer 2 multiplexes cells received from only working line interfaces to produce a sequence of cells according to a multiplex control signal. In such a normal condition, the operation of the header conversion section 3 is the same as that in the first embodiment as shown in FIG. 4.

Figure 6:
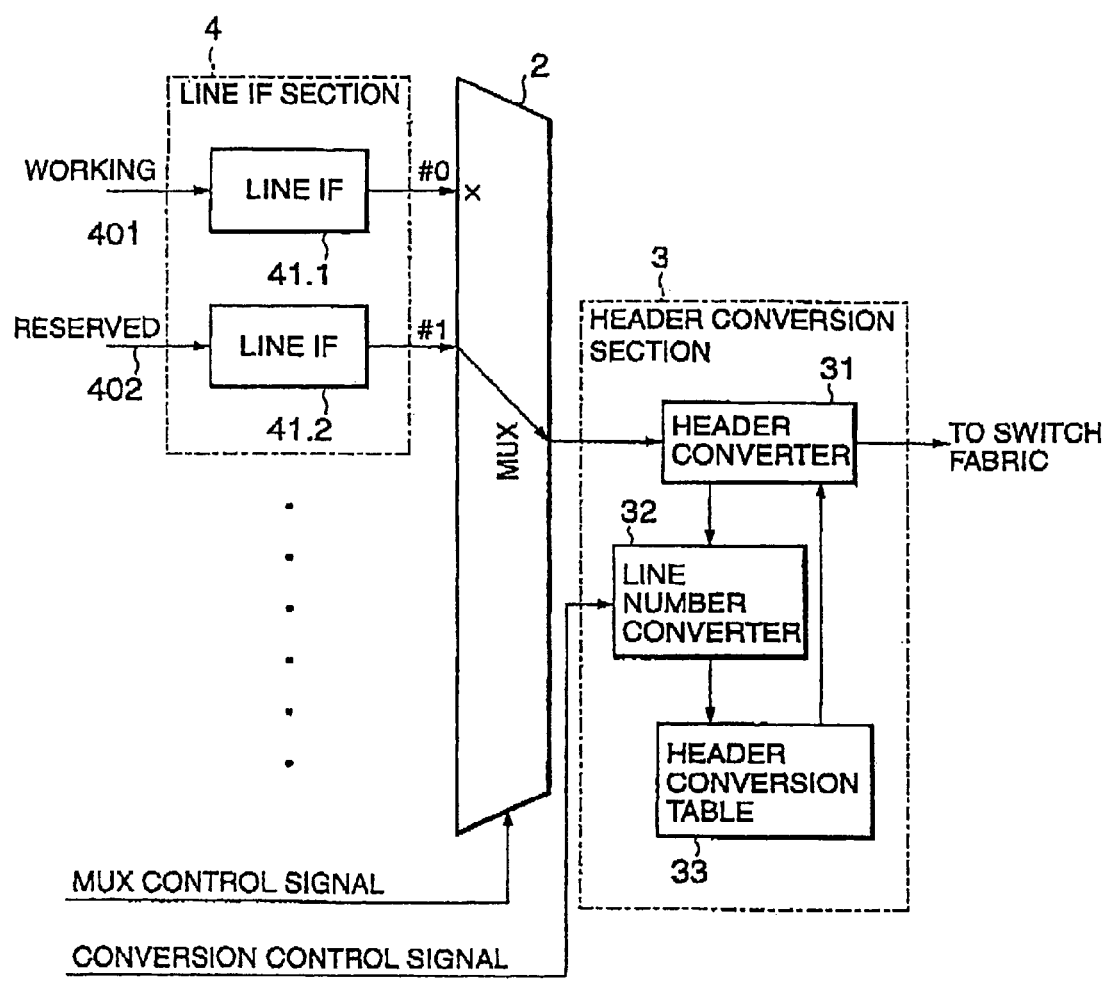
FIG. 6 is a block diagram showing the input stage of the ATM switching device of FIG. 5 for explanation of an operation of the second embodiment.

As shown in FIG. 6, in the event of a failure on the working line 401 or the line interface 41.1, the occurrence of the failure is detected by a well-known means and thereby the multiplex control signal is changed so as to control the multiplexer 2 such that cells received from the line interface 41.2 connected to the reserved line 402 are selected to be multiplexed. At the same time, the conversion control signal causes the line number converter 32 to switch the line number #1 to the line number #0.

Figure 7:
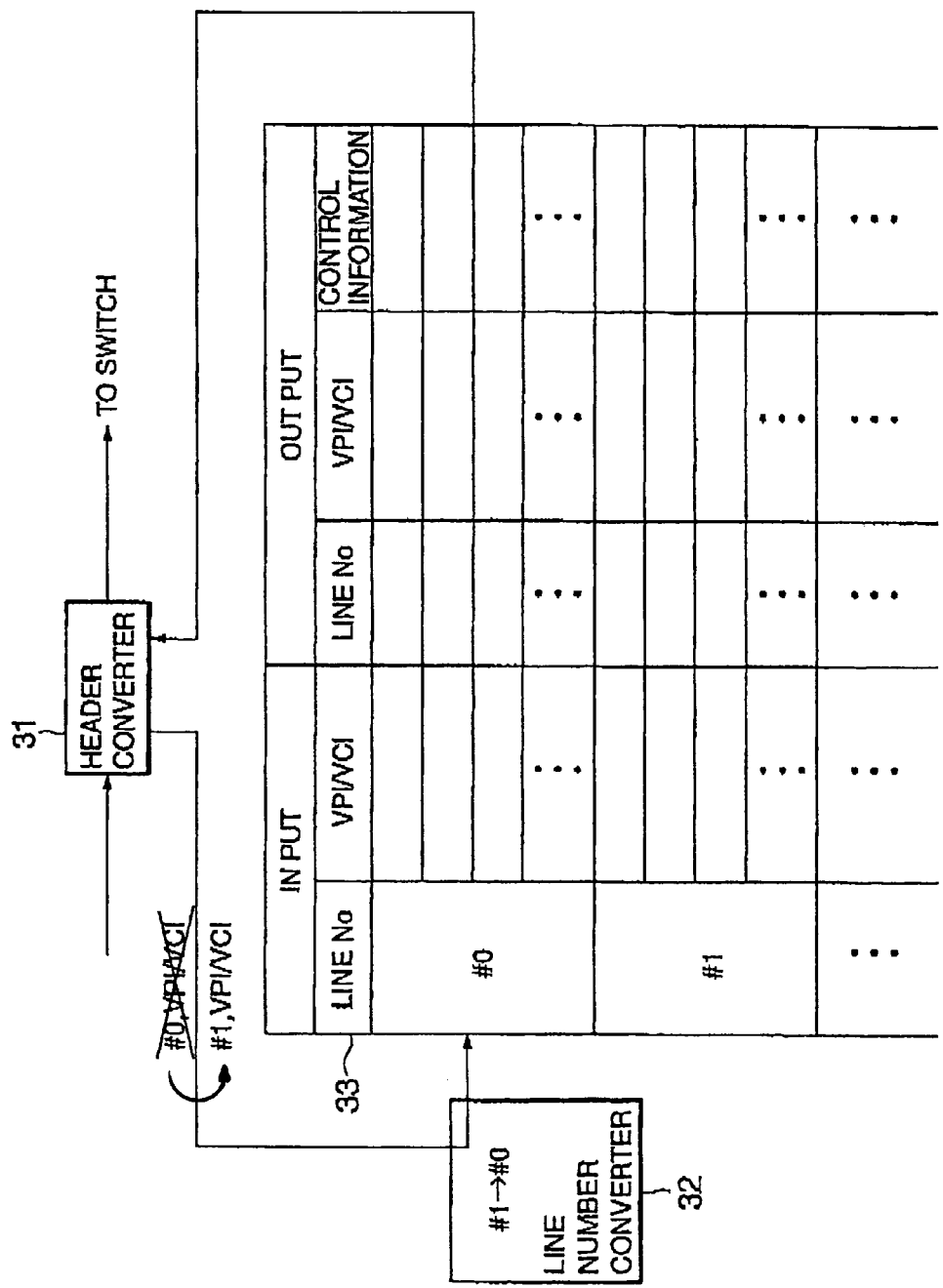
FIG. 7 is a schematic diagram showing a header conversion method according to the second embodiment.

Referring to FIG. 7, more specifically, when the multiplexer 2 switches an incoming route from the line interface 41.1 to the line interface 41.2 in response to the occurrence of the failure, cells output from the line interface 41.2 having the line number #1 assigned thereto are multiplexed and transferred to the header converter 31 together with the line number #1.

The header converter 31 reads the line number #1 and the routing information from each of the cells and outputs them to the line number converter 32 and the header conversion table 33. Since the line number converter 32 has been set to such a state that the working line number #1 is converted to the reserved line number #0, the output information corresponding to input information for the line number #0 is accessed and returned to the header converter 31. In other words, the header converter 31 can obtain the same output information as in the normal case from the header conversion table 33 after and before the failure on the working line 401 occurs. Accordingly, the cells on the reserved system can be transferred to the switch fabric as the case of the cells on the working system without the need of the installation of information for the reserved system in the header conversion table 33.

N:1 Redundant System

Figure 8:
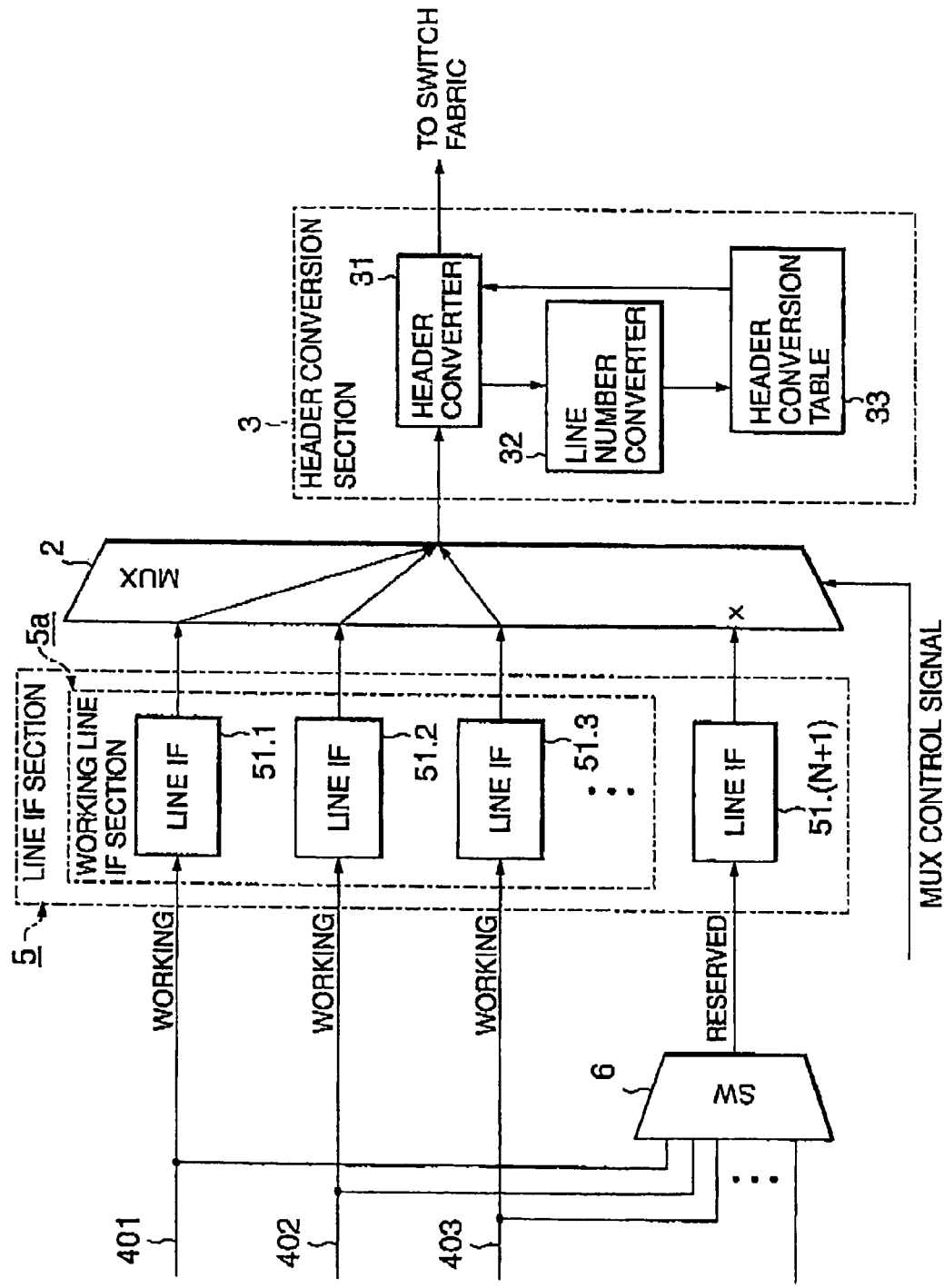
FIG. 8 is a block diagram showing an input stage of an ATM switching device employing a header conversion method according to a third embodiment of the present invention.

Referring to FIG. 8, an ATM switching device employing a header conversion circuit according to a third embodiment of the present invention has an N:1 redundant architecture, in which circuit blocks similar to those previously described with reference to FIG. 2 are denoted by the same reference numerals.

A line interface section 5 includes a working line interface section 5a composed of N working line interfaces 51.1 to 51.N corresponding to respective ones of N working lines 401, 402, 403, . . . and a reserved line interface 51.(N+1). Here, line numbers #0 to #N are assigned to the working line interfaces 51.1 to 51.N and the reserved line interface 51.(N+1), respectively.

In addition, a selector switch 6 is connected between the N working lines and the reserved line interface 51.(N+1). The selector switch 6 has N input ports connected to respective ones of the N working lines and one output port connected to the reserved line interface 51.(N+1). When one of the working line interfaces 51.1 to 51.N is faulty, the selector switch 6 is switched by a selection signal so that the reserved line interface 51.(N+1) is used in place of the fault line interface. The working and reserved line interfaces 51.1 to 51.(N+1) are connected to the multiplexer 2.

When normally operating, the multiplexer 2 multiplexes cells received from only working line interfaces 51.1 to 51.N to produce a sequence of cells according to a multiplex control signal. In such a normal condition, the operation of the header conversion section 3 is the same as that in the first embodiment as shown in FIG. 4.

Figure 9:
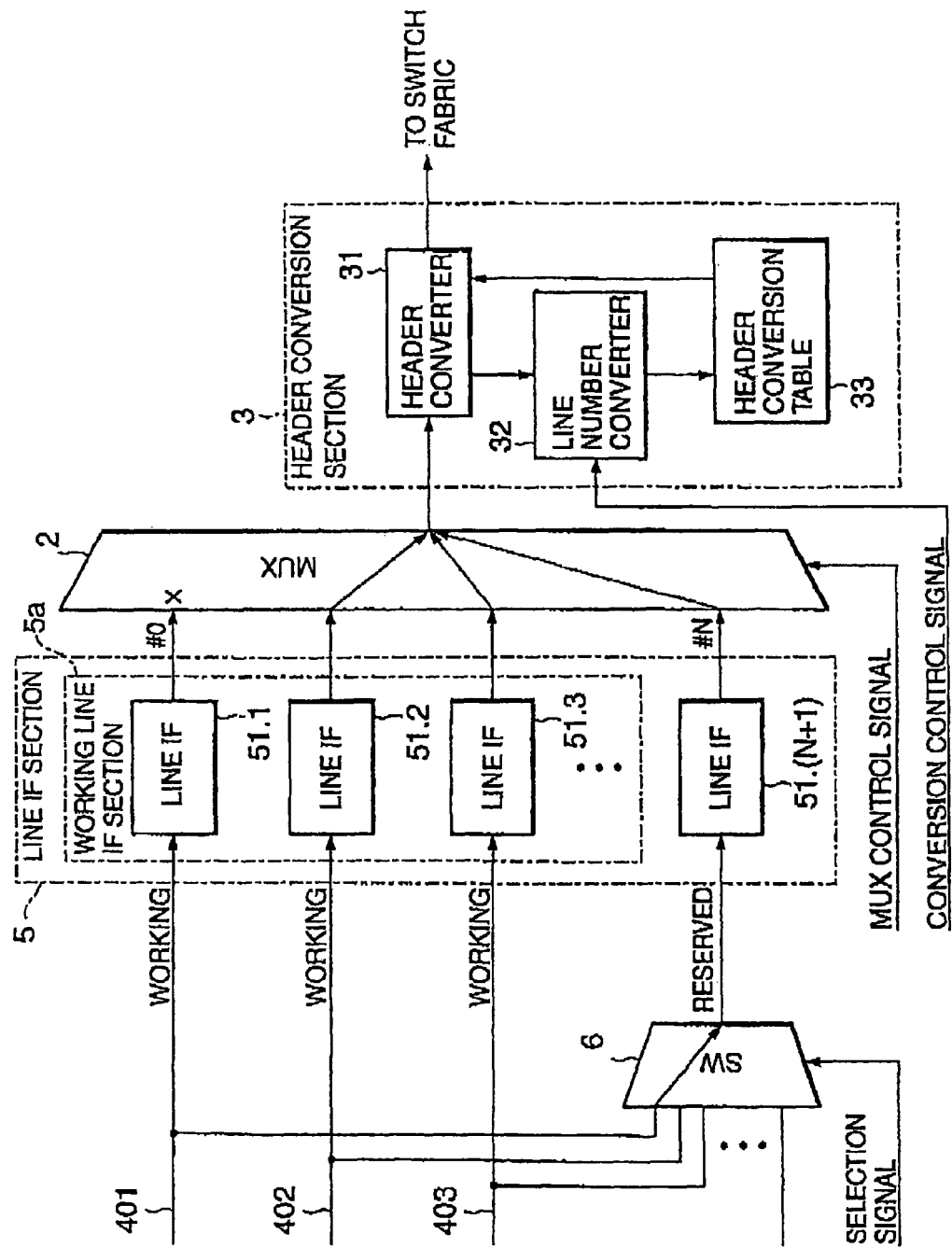
FIG. 9 is a block diagram showing the input stage of the ATM switching device of FIG. 8 for explanation of an operation of the third embodiment.

As shown in FIG. 9, in the event of a failure on the working line interface 51.1, the occurrence of the failure is detected by a well-known means because no cell is received from the working line interface 51.1. When the occurrence of the failure is detected on the working line interface 51.1, the selection signal is changed so as to connect the working line 401 corresponding to the fault line interface 51.1 to the reserved line interface 51.(N+1) and thereby incoming cells on the working line 401 are transferred to the reserved line interface 51.(N+1). Further the multiplex control signal is changed so as to control the multiplexer 2 such that cells received from the reserved line interface 51.(N+1) are selected to be multiplexed. At the same time, the conversion control signal causes the line number converter 32 to convert the line number #N to the line number #0.

Figure 10:
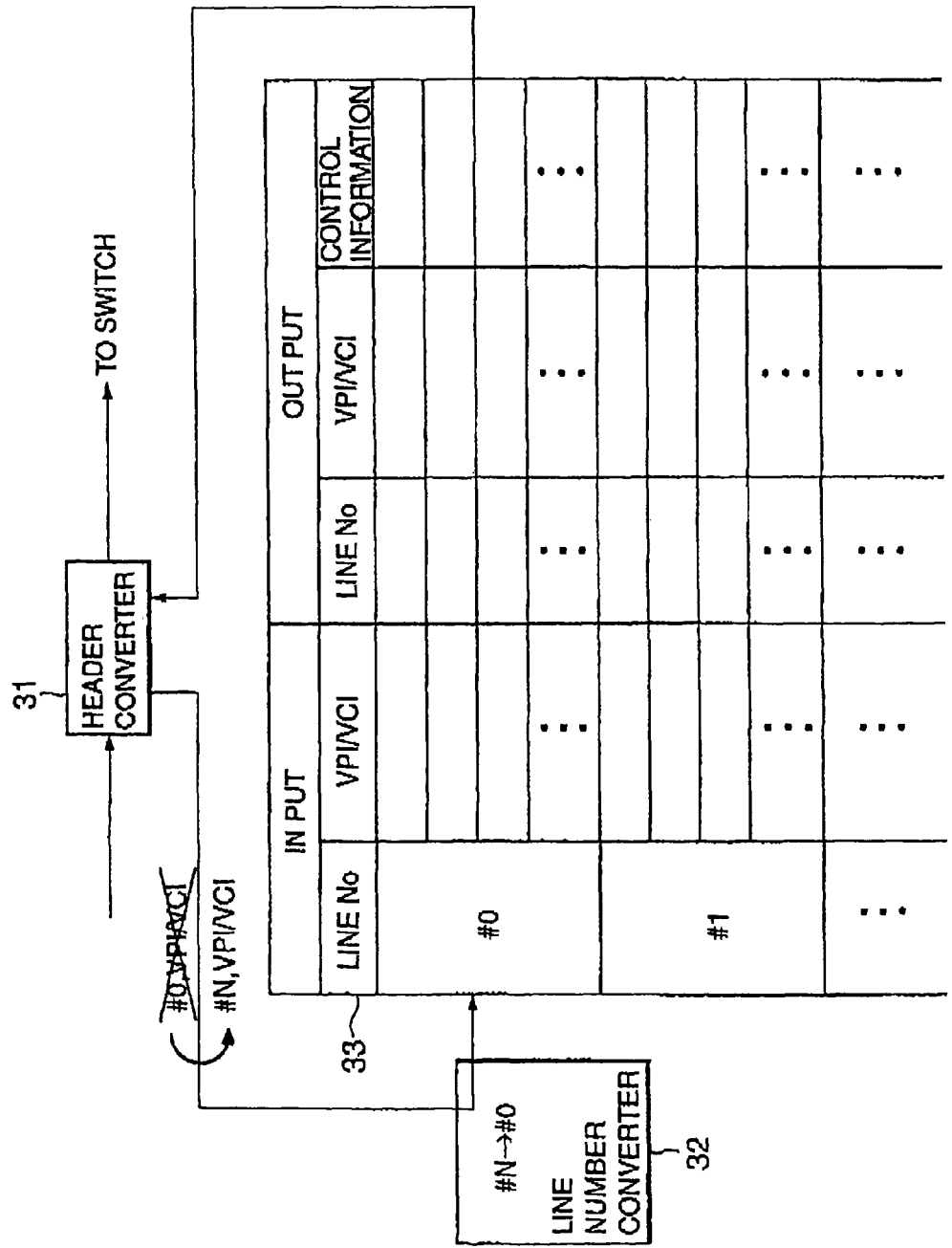
FIG. 10 is a schematic diagram showing a header conversion method according to the third embodiment.

Referring to FIG. 10, more specifically, when the multiplexer 2 switches an incoming route from the line interface 51.1 to the reserved line interface 51.(N+1) in response to the occurrence of the failure, cells output from the reserved line interface 51.(N+1) having the line number #N assigned thereto are multiplexed and transferred to the header converter 31 together with the line number #N.

The header converter 31 reads the line number #N and the routing information from each of the cells and outputs them to the line number converter 32 and the header conversion table 33. Since the line number converter 32 has been set to such a state that the line number #N is converted to the line number #0, the output information corresponding to input information for the line number #0 is accessed and returned to the header converter 31. In other words, the header converter 31 can obtain the same output information as in the normal case from the header conversion table 33 after and before the failure on the working line interface 51.1 occurs. Accordingly, the cells coming in on the working line 401 can be transferred to the switch fabric through the reserved line interface 51.(N+1) as the case of the cells on the working line interface 51.1 without the need of the installation of information for the reserved line interface 51.(N+1) in the header conversion table 33.

In the above embodiments, the line number converter 32 is provided in the header conversion section 3. Alternatively, it is possible to provide the line number converter 32 in the reserved line interface 41.2 or 51.(N+1) or the multiplexer 2. Further, it is possible to provide the line number converter 32 on the cell transfer line between the multiplexer 2 and the header conversion section 3.

As described above, there is no need of a conversion table used for a reserved line interface, resulting in the reduced size of a decoder or CAM for converting the routing information to a memory address and further the reduced amount of memory required for the header conversion table. This may promote miniaturization and achieve cost-reduction effectively.

Since the same table as the working header conversion table is accessed even if switching to the reserved line interface, the identical information can be obtained to convert the header information in both working and reserved systems. Accordingly, it can be avoided that the line switching cannot be successfully performed. Further, in the case of N:1 redundant system, there is no need of the installation of data duplicating means. Since data duplication is not needed, high-speed line switching can be achieved.

The invention claimed is:

1. A network device comprising:
    a first line interface associated with a first line number;
    a second line interface associated with a second line number,
    where the second information is different than the first information;
    a first converter to:
        convert the second line number to the first line number when a failure of the first line interface is detected; and
    a second converter to:
        receive, from the second line interface, information identifying a packet,
        obtain, in response to a request for output information corresponding to the second line number, output information corresponding to the first line number, where the output information corresponding to the first line number is obtained using the first line number after the second line number is converted to the first line number, and convert, using the obtained output information corresponding to the first line number, a header of the packet, where the converted header indicates that the packet was received from the first line interface.

2. The network device of claim 1, where the second line interface serves as a backup to the first line interface.

3. The network device of claim 1,
where the obtained output information corresponds to input information for the first line number, and
where, when converting the header of the packet, the second converter is to:
convert, using the obtained output information corresponding to the input information of the first line number, the header of the packet.

4. The network device of claim 1, further comprising:
a header conversion table to store header conversion information for the first line interface.

5. The network device of claim 1, where the second line number is converted to the first line number based on a failure of the first line interface.

6. The network device of claim 1, where the second converter is further to:
obtain the second line number from the packet, and
transmit the second line number to the first converter included in the network device,
where the first converter is to convert the transmitted second line number to the first line number, and
where the output information is obtained using the first line number converted from the second line number.

7. A network device comprising:
a first converter to:
receive first information associated with a received packet, the first information corresponding to a first input interface, the packet being received from the first input interface, and
convert the first information to second information corresponding to a second input interface that is different than the first input interface,
where the second information is different than the first information; and
a second converter to:
request, using the first information, output information corresponding to the first input interface,
obtain output information corresponding to the second input interface, in response to requesting the output information corresponding to the first input interface,
where the output information corresponding to the second input interface is obtained using the second information based on the first information being converted to the second information, and
convert, using the obtained output information corresponding to the second input interface, a header of the packet.

8. The network device of claim 7, further comprising:
a header conversion table to store header conversion information for the second input interface.

9. The network device of claim 8, where the header conversion table is searched using the second information in response to the second converter requesting, using the first information, output information corresponding to the first input interface.

10. The network device of claim 7, where the first converter is further to:
receive the first information based on another received packet received from the first input interface, and
convert the first information, associated with the other packet, to third information associated with a third input interface that is different than the first input interface,
and where the second converter is further to:
convert a header associated with the other packet using output information associated with the third information.

11. The network device of claim 7, where the first input interface is a backup to the second input interface.

12. A method performed by a device, the method comprising:
receiving, by a first converter of the device, first information associated with a packet, the first information corresponding to a first input interface, the packet being received from the first input interface;
converting, by the first converter, the first information to second information corresponding to a second input interface that is different than the first input interface,
where the second line number is different than the first line number;
obtaining, by a second converter of the device and for the packet, header information associated with the second input interface, in response to a request for header information associated with the first input interface,
where the header information associated with the second input interface is obtained using the second information, based on the first information being converted to the second information;
converting, by the second converter and using the obtained header information associated with the second input interface, a header of the packet; and
forwarding, using the converted header, the packet.

13. The method of claim 12, further comprising:
receiving, by the first converter, the first information based on another packet, the other packet being received from the first input interface;
converting, by the first converter, the first information associated with the other packet to third information associated with a third input interface that is different than the first input interface;
obtaining, by the second converter and based on the third information, header information corresponding to the third input interface; and
converting, using the obtained header information corresponding to the third input interface, a header of the other packet.

14. The method of claim 12, where the header information is associated with input information for the second input interface,
the method further comprising:
detecting that the second input interface is experiencing a failure,
where the first information is converted to the second information based on detecting that the second input interface is experience a failure.

15. The method of claim 12, further comprising:
detecting a failure of the second input interface,
where the first information is converted to the second information based on detecting the failure of the second input interface, and
where the first information is converted to the second information prior to obtaining the header information associated with the second input interface.

16. The method of claim 12, further comprising:
obtaining, by the second converter, the first information from the packet,
where the first information is received from the second converter.

17. A method performed by a device, the method comprising:
selecting, by the device, a first line interface to receive a packet stream;
selecting, by the device and when the first line interface is experiencing a failure, a second line interface to receive the packet stream;
obtaining, by the device and using first information associated with the first line interface, output information associated with the first line interface,
where second information, associated with the second line interface, is converted to the first information by a first converter of the device, and
where the output information is obtained using the first information, converted from the second information, in response to a request for output information corresponding to the second line interface; and
converting, by a second converter of the device and using the obtained output information associated with the first line interface, a header of a packet, of the packet stream, received from the second line interface,
where the converted header indicates that the packet was received from the first line interface.

18. The method of claim 17, further comprising:
converting, when the first line interface is experiencing a failure and prior to obtaining the output information associated with the first line interface, the second information, associated with the second line interface, to the first information associated with the first line interface,
where the request for the output information identifies the second information.

19. The method of claim 18, further comprising:
detecting that the first line interface is experiencing a failure,
where the second information is converted to the first information based on detecting that the first line interface is experiencing the failure.

20. The method of claim 17, further comprising:
detecting that the first line interface is experiencing a failure; and
converting, associated with the first line interface, to the information associated with the second line interface, based on detecting that the first line interface is experiencing a failure,
where the other information, associated with the first line interface, is converted to the information, associated with the second line interface, prior to obtaining the output information associated with the second line interface.

* * * * *

UNITED STATES PATENT AND TRADEMARK OFFICE
CERTIFICATE OF CORRECTION

PATENT NO.        : 8,154,994 B2
APPLICATION NO.   : 11/207198
DATED             : April 10, 2012
INVENTOR(S)       : Hideyuki Furuichi Page 1 of 1

It is certified that error appears in the above-identified patent and that said Letters Patent is hereby corrected as shown below:

Claim 1, column 6, lines 56-57 should read: "where the second line number is different than the first line number"

Signed and Sealed this
Twenty-eighth Day of August, 2012

David J. Kappos
*Director of the United States Patent and Trademark Office*